(12) United States Patent
Krishnamurthy et al.

(10) Patent No.: US 8,976,774 B2
(45) Date of Patent: *Mar. 10, 2015

(54) RADIO LINK PERFORMANCE PREDICTION IN WIRELESS COMMUNICATION TERMINAL

(71) Applicant: Motorola Mobility LLC, Libertyville, IL (US)

(72) Inventors: Sandeep H. Krishnamurthy, Mountain View, CA (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/855,746

(22) Filed: Apr. 3, 2013

(65) Prior Publication Data

US 2013/0215783 A1     Aug. 22, 2013

Related U.S. Application Data

(63) Continuation of application No. 12/605,461, filed on Oct. 26, 2009, now Pat. No. 8,442,021.

(60) Provisional application No. 61/112,515, filed on Nov. 7, 2008.

(51) Int. Cl.
*H04J 3/06* (2006.01)
*H04W 24/02* (2009.01)
(Continued)

(52) U.S. Cl.
CPC ............... *H04W 24/02* (2013.01); *H04L 1/20* (2013.01); *H04L 1/0016* (2013.01); *H04L 1/0026* (2013.01)
USPC .......................................... 370/342; 370/350

(58) Field of Classification Search
CPC ........................................................ H04W 24/02
USPC ............................................ 370/252, 342, 350
See application file for complete search history.

(56) References Cited

U.S. PATENT DOCUMENTS 5,815,538 A  9/1998  Grell et al.
6,580,748 B1  6/2003  Muraoka
(Continued)

FOREIGN PATENT DOCUMENTS

CN    101189823 A    5/2008
EP     1768332 A2    3/2007
(Continued)

OTHER PUBLICATIONS

United States Patent and Trademark Office, "Notice of Allowance and Fee(s) Due" for U.S. Appl. No. 12/605,461 dated Feb. 22, 16 pages.

(Continued)

*Primary Examiner* — Farah Faroul
(74) *Attorney, Agent, or Firm* — Lerner, David, Littenberg, Krumholz & Mentlik, LLP

(57) ABSTRACT

A method for predicting performance of a radio link in a wireless communication terminal including hypothesizing a second codeword including information associated with a hypothesized first codeword, obtaining channel state information from a received signal, and estimating a decoder error rate of the first codeword under a condition that the second codeword may not be decoded correctly, wherein the decoder error rate is estimated using the channel state information.

15 Claims, 3 Drawing Sheets

(51) Int. Cl.
*H04L 1/20* (2006.01)
*H04L 1/00* (2006.01)

(56) References Cited

U.S. PATENT DOCUMENTS

| | | | |
|---|---|---|---|
| 6,625,467 | B2 | 9/2003 | New et al. |
| 6,782,066 | B1 | 8/2004 | Nicholas et al. |
| 7,046,694 | B2 * | 5/2006 | Kumar ............................ 370/487 |
| 8,300,757 | B2 | 10/2012 | Krishnamurthy et al. |
| 8,315,226 | B2 * | 11/2012 | Borran et al. ................... 370/331 |
| 2005/0120282 | A1 | 6/2005 | Kim |
| 2008/0008212 | A1 | 1/2008 | Wang et al. |
| 2008/0019279 | A1 | 1/2008 | Kim et al. |
| 2008/0186893 | A1 | 8/2008 | Kolding et al. |
| 2008/0233963 | A1 | 9/2008 | Alanara et al. |
| 2009/0011714 | A1 | 1/2009 | Hozumi |
| 2009/0296864 | A1 | 12/2009 | Lindoff et al. |
| 2010/0027456 | A1 | 2/2010 | Onggosanusi et al. |
| 2010/0034092 | A1 | 2/2010 | Krishnamurthy et al. |
| 2010/0113008 | A1 | 5/2010 | Wang et al. |
| 2010/0113028 | A1 | 5/2010 | Simonsson et al. |
| 2010/0118856 | A1 | 5/2010 | Krishnamurthy et al. |
| 2010/0122121 | A1 | 5/2010 | Krishnamurthy et al. |
| 2010/0265862 | A1 | 10/2010 | Choi et al. |
| 2011/0110251 | A1 | 5/2011 | Krishnamurthy et al. |
| 2011/0268063 | A1 * | 11/2011 | Hammarwall et al. ....... 370/329 |
| 2012/0026935 | A1 * | 2/2012 | Park et al. ...................... 370/315 |
| 2012/0044982 | A1 | 2/2012 | Sampath et al. |
| 2012/0108177 | A1 | 5/2012 | Miao et al. |
| 2012/0327984 | A1 | 12/2012 | Krishnamurthy et al. |
| 2013/0215783 | A1 * | 8/2013 | Krishnamurthy et al. .... 370/252 |
| 2013/0242975 | A1 | 9/2013 | Krishnamurthy et al. |
| 2013/0315358 | A1 | 11/2013 | Krishnamurthy et al. |
| 2014/0219214 | A1 * | 8/2014 | Hammarwall et al. ....... 370/329 |

FOREIGN PATENT DOCUMENTS

| | | |
|---|---|---|
| EP | 1947812 A1 | 7/2008 |
| JP | 2006-121159 A | 5/2006 |
| JP | 2008-92383 A | 4/2008 |
| WO | 9823118 A1 | 5/1998 |
| WO | 0101610 A1 | 1/2001 |
| WO | 2007130324 A2 | 11/2007 |
| WO | 2008073144 A1 | 6/2008 |
| WO | 2010062503 A2 | 6/2010 |

OTHER PUBLICATIONS

United States Patent and Trademark Office, "Notice of Allowance" for U.S. Appl. No. 13/605,173 dated Apr. 11, 2013, 7 pages.

Jensen et al., "Mutual Information Metrics for Fast Link Adaptation in IEEE 802.11n" ICC 2008 proceedings; 6 pages.

Mumtaz et al., "EESM for IEEE 802.16e: WiMaX" Seventh IEEE/ACIS Internation Conference on Computer and Information Science; 2008; 6 pages.

3GPP TSG RAN WG4 #48bis, R4-082655 "Response LS on indicating radio problem detection" RAN4; Edindurgh, UK; Sep. 29-Oct. 3, 2008; 2 pages.

3GPP TSG RAN WG4 #48bis, R4-082657 "Radio Link Monitoring Requirements" Ericsson; Edinburgh, Scotland, UK; Sep. 29-Oct. 3, 2008; 3 pages.

3GPP TSG RAN WG4 #48bis, R4-082439 "Radio Link Problem Detection" Nokia; Edinburgh, United Kinghom; Sep. 29-Oct. 3, 2008, 7 pages.

3GPP TSG-RAN WG4 Meeting #48, R4-081998 "Details on radio link failure and recovery in LTE" Motorola, Jeju, South Korea; Aug. 18-22, 2008, 8 pages.

Love et al., "Downlink Control Channel Design for 3GPP LTE" Wireless Communication and Networking Conference, 2008; Mar. 31, 2008; 6 pages.

3GPP TSG RAN WG1 #42, R1-050718 "EESM Link Error Prediction for EUTRA System Evaluation" Motorola; London, UK; Aug. 29-Sep. 2, 2005, 14 pages.

3GPP TSG RAN WG4 #48, R4-082189 "Simulation Assumptions for Out-of-Sync and In-Sync Detection in LTE" Motorola; Jeju, SouthKorea; Aug. 18-22, 2008, 3 pages.

3GPP TSG RAN WG4 #49, R4-083038 "Radio Link Problem Detection in LTE" NTT DoCoMo; Prague, Czech Republic; Nov. 10-14, 2008, 4 pages.

3GPP TSG RAN WG4 #49, R4-083333 "Radio Link Monitoring" Motorola, Ericsson; Prague, Czech Republic; Nov. 10-14, 2008; 5 pages.

3GPP TSG RAN WG4 #48, R4-081726 "Radio Link Problem Detection by the UE" Nortel Networks; Jeju, Korea; Aug. 18-22, 2008; 6 pages.

3GPP TSG RAN WG4 #48bis, R4-082490 "E-UTRA Out-of-Sync and In-Sync Requirements in DRX", Ericsson; Edinburgh, Scotland, UK; Sep. 23-Oct. 3, 2008, 3 pages.

3GPP TSG RAN WG1 #53, R1-082252 "LS on indicating radio problem detection" TSG-RAN-WG1; Kansas City, USA; May 4-9, 2008; 1 page.

3GPP TSG RAN WG4 #47 bis, R4-081399 "Out of Synchronization Detection in E-UTRAN" Ericsson; Munich, Germany; Jun. 16-20, 2008, 6 pages.

The State Intellectual Property Office of the People's Republic of China, "Notification of the First Office Action" for Chinese Patent Application No. 200980144460.9 dated Jul. 1, 2013, 8 pages.

* cited by examiner

RADIO LINK PERFORMANCE PREDICTION IN WIRELESS COMMUNICATION TERMINAL

CROSS REFERENCE TO RELATED APPLICATIONS

The present application is related to U.S. Application No. 61/112,515 filed on 7 Nov. 2008, the contents of which are hereby incorporated by reference and from which benefits are claimed under 35 U.S.C. 119.

FIELD OF THE DISCLOSURE

The present invention relates to a wireless communications and more particularly to predicting radio link performance based on a predicted decoder error rate in a wireless communication terminal.

BACKGROUND

In some wireless communication systems, the decoding of an information-bearing codeword (CW2) requires that another information-bearing codeword (CW1) be decoded correctly. CW2 may thus be denoted by the term "compound codeword" as decoding of CW1 is essential for the correct decoding of CW2. For example, CW1 could contain information regarding transmission parameters used in transmitting CW2 which are essential for the decoding of CW2. The transmission parameters may include the number of OFDM symbols on which CW2 is transmitted, or the time-frequency sub-carrier mapping used for carrying CW2, (e.g., start and range of resource elements in the time-frequency grid on to which the codeword is mapped), or coding scheme (e.g., block code, convolutional code, turbo-code, etc.), or a code-rate, or block size, or encoded information bit length, or modulation type, or a redundancy version number of the codeword in a hybrid ARQ transmission using incremental redundancy, or transmit antenna type (e.g., SIMO, Tx diversity, spatial multiplexing, etc.), or the precoding used, or the transmission rank, etc.

CW1 and CW2 may correspond to a block code (linear or otherwise) or a convolution code or a turbo-code or an uncoded transmission. Generally, a receiver decodes CW1 first and then tries to decode to CW2. Suppose a receiver wants to predict the practical decoder performance of CW2, then it has to jointly consider this with the fact that decoding of CW1 can be erroneous. In E-UTRA standard, one application of the above method is for obtaining an estimate of overall error probability of PDCCH. In this example, CW1 corresponds to a physical control formatting indicator channel (PCFICH) which contains information about the PDCCH codeword transmission parameters like the number of OFDM symbol containing control information in the subframe under different deployment configurations as specified in Table 6.7-1 of 36.211 and Table 5.3.4-1 of 36.212 reproduced below:

TABLE 6.7-1

Number of OFDM symbols used for PDCCH

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting both PMCH and PDSCH for 1 or 2 cell specificc antenna ports | 1, 2 | 2 |
| MBSFN subframes on a carrier supporting both PMCH and PDSCH for 4 cell specific antenna ports | 2 | 2 |
| MBSFN subframes on a carrier not supporting PDSCH | 0 | 0 |
| All other cases | 1, 2, 3 | 2, 3, 4 |

TABLE 5.3.4-1

CFI Codewords

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

CW2 corresponds to a physical downlink control CH (PDCCH) codeword. The correct decoding of PCFICH is necessary for correctly decoding the PDCCH codeword. The channel state information corresponding to the PCFICH transmission can be used to estimate the block error rate using a mapping function that uses the subcarrier level SINR information. Another mapping function that uses the subcarrier level SINR information can be used to obtain the conditional probability of error in decoding the PDCCH under the assumption that PCFICH has been decoded correctly.

In another example, in an E-UTRA link, suppose that a physical downlink shared channel (PDSCH) codeword is scheduled by DCI information embedded in a PDCCH codeword. Then correct decoding of the PDSCH codeword is dependent on correct decoding of both PDCCH that contains scheduling information and the PCFICH codeword.

Methods for estimating BLER corresponding to a coded packet transmission from the subcarrier SINR information in an OFDM system are known generally. Two of the well-known methods, effective exponential-sum-of-SINR mapping (EESM) and mean mutual information per bit (MMIB) mapping, use the principle that the average BLER function corresponding to a packet transmission with a fixed set of parameters such as encoding type, codeword length, information size (or alternately code rate), modulation type, etc. can expressed in terms of basis functions of the appropriate type. A third method is to map instead the first few moments of the sample sub-carrier SINR distribution to BLER. The EESM, MMIB and the third approach are listed below as applied to OFDM systems.

Suppose that two codewords CW1 and CW2 are transmitted. Correct decoding of CW1 is necessary for the correct decoding of CW2 as transmission parameters associated with CW2 are embedded in CW1. Now, suppose that a receiver wants to estimate the block error rate of decoding CW2. The probability of correct decoding CW2 conditioned on the correct decoding of CW1 might be different from the probability of correct decoding of CW2. This can happen due to one of more of the following side conditions: 1. Difference in coderates, block-sizes of the different codewords; 2. Coding schemes used for the encoding of the information embedded in the two codewords; and 3. Operating SINR-point, interference statistics, etc. In the prior art, the problem of predicting the block error rate of a codeword when such dependencies exist has not been addressed.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

In the present disclosure, the block error rate (BLER) of codeword 2 (CW2) can be estimated from BLER of codeword 1 (CW1) and the conditional error probability of decoding CW2 upon correct decoding of CW1. This would provide for better estimates of the error rate of CW2 than that achievable using an estimator that uses the conditional error probability of decoding CW2 upon correct decoding of CW1.

Figure 1:
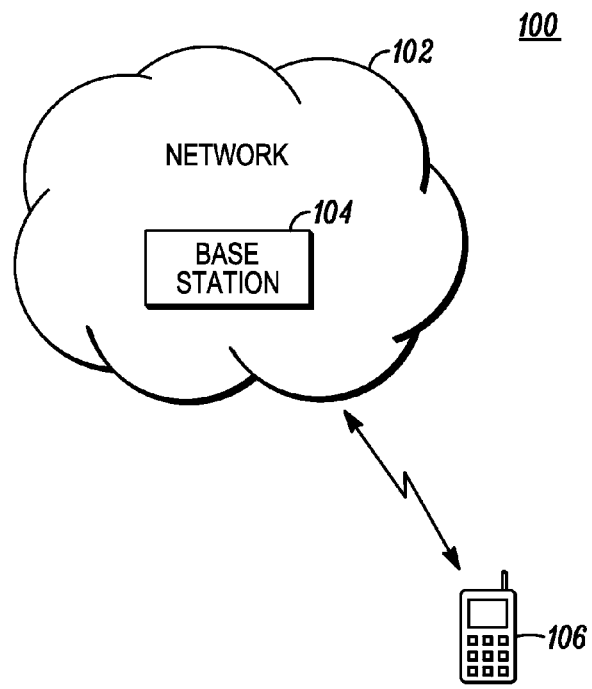
FIG. 1 illustrates a communication system.

FIG. 1 illustrates a communication system 100 including a communications network 102 comprising a base station 104 and user equipment (UE) 106. Various communication devices may exchange data or information through the network. The network may be an evolved universal terrestrial radio access (E-UTRA) or other type of telecommunication network. In one embodiment, the base station may be a distributed set of servers in the network. The UE 106 may be one of several types of handheld or mobile devices, such as, a mobile phone, a laptop, or a personal digital assistant (PDA). In one embodiment, the UE 106 may also be a WIFI capable device, a WIMAX capable device, or other wireless devices.

Figure 2:
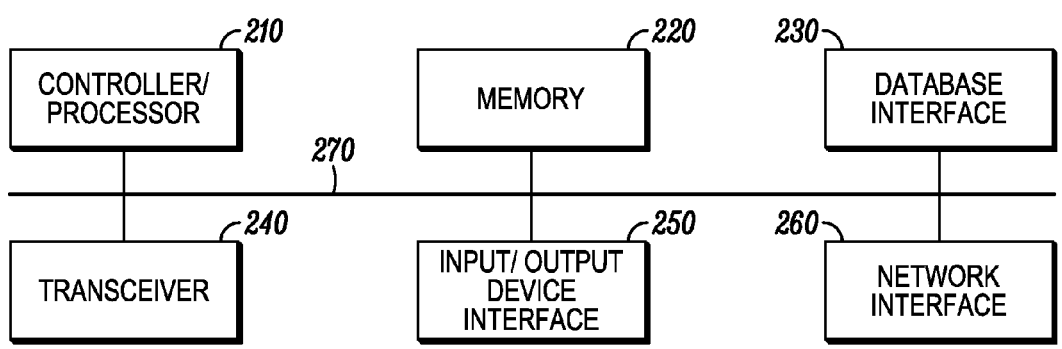
FIG. 2 illustrates a possible configuration of a computing system to act as a base station.

FIG. 2 illustrates a possible configuration of a computing system to act as a base station comprising a controller/processor 210, a memory 220, a database interface 230, a transceiver 240, input/output (I/O) device interface 250, and a network interface 260, connected through bus 270. The base station may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

In FIG. 2, the controller/processor 210 may be any programmable processor. The subject of the disclosure may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

In FIG. 2, the memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. In FIG. 2, the database interface 230 may be used by the controller/processor 210 to access the database. The database may contain any formatting data to connect the UE to the network. The transceiver 240 may create a data connection with the UE. The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The network connection interface 260 may be used to connect the teleconference device to the network connecting the user to other users in the teleconference. The components of the base station may be connected via an electrical bus 270, for example, or linked wirelessly.

Client software and databases may be accessed by the controller/processor 210 from memory 220, and may include, for example, database applications, word processing applications, as well as components that embody the decision support functionality of the present invention. The base station may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
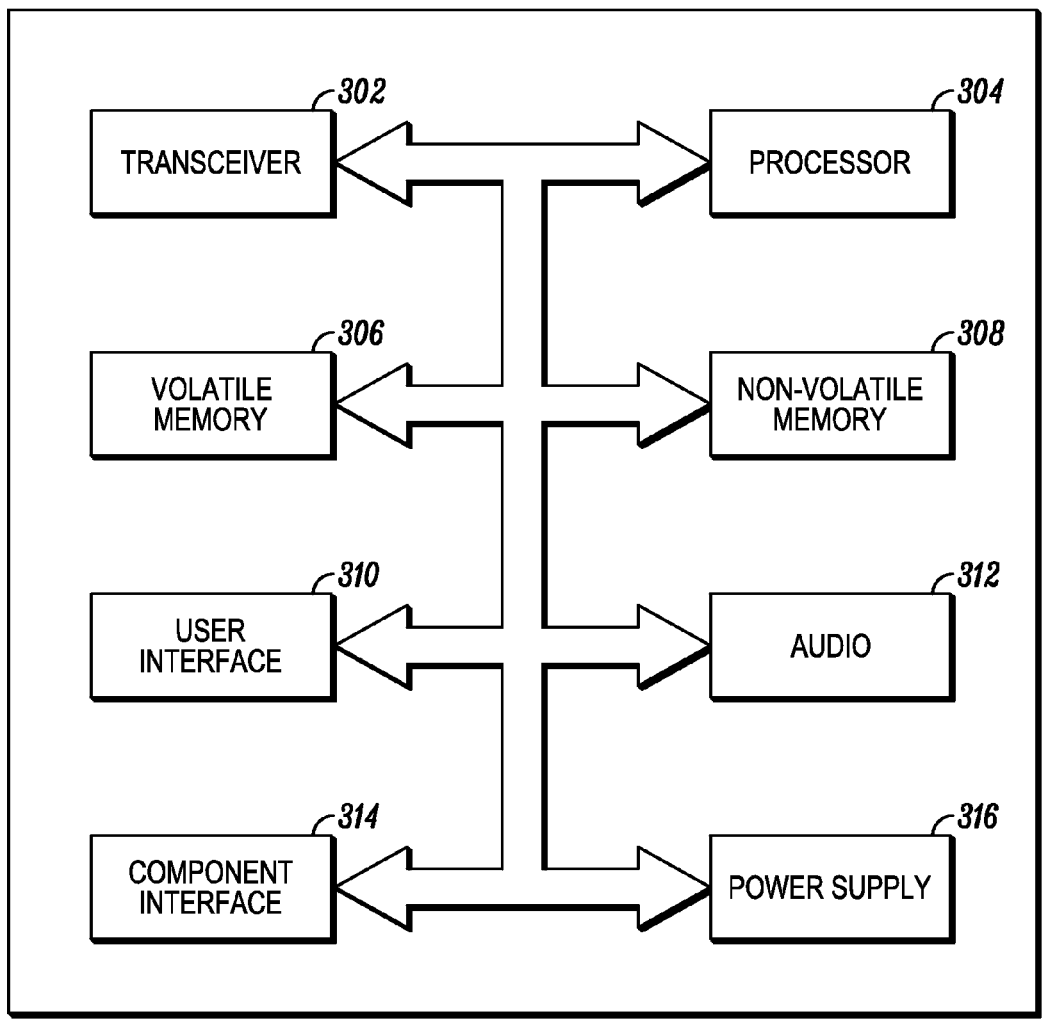
FIG. 3 illustrates in a UE block diagram.

FIG. 3 illustrates in a block diagram one embodiment of a telecommunication apparatus or electronic device configured as the UE. The UE comprises a transceiver 302, which is capable of sending and receiving data over the network 102. The UE includes a processor 304 that executes stored programs. The UE may also include a volatile memory 306 and a non-volatile memory 308 which are used by the processor 304. The UE may include a user input interface 310 that may comprise elements such as a keypad, display, touch screen, and the like. The UE also typically includes a user output device that may comprise a display screen and an audio interface 312 that may comprise elements such as a microphone, earphone, and speaker. The UE also may include a component interface 314 to which additional elements may be attached, for example, a universal serial bus (USB) interface, and a power supply 316.

Consider a transmission in a wireless system such that at least two codewords are part of the transmission, wherein one of the codewords (denoted as "primary codeword") is decodable correctly only if one or more of the remaining codewords transmitted are decoded correctly. These other codewords contain some essential information on the transmission parameters used for the primary codeword.

The receiver needs to estimate the block error rate (BLER) associated with the decoding of the primary codeword. This can be accomplished by using the equations listed below. The receiver would use the channel state information to estimate the BLER of the primary codeword based on some error probabilities associated with the decoding of the codewords whose correct decoding is necessary for the correct decoding of the primary codeword. Alternatively, the receiver could use an estimate of the channel state information obtained from the reference signal or pilot transmission in addition to the estimate of the interference/noise statistics to estimate the BLER of the primary codeword based on some error probabilities associated with the decoding of the codewords whose correct decoding is necessary for the correct decoding of the primary codeword. The channel state information includes for example, an SINR profile, or interference statistics (variance), estimates of channel coefficients among other channel information.

Figure 4:
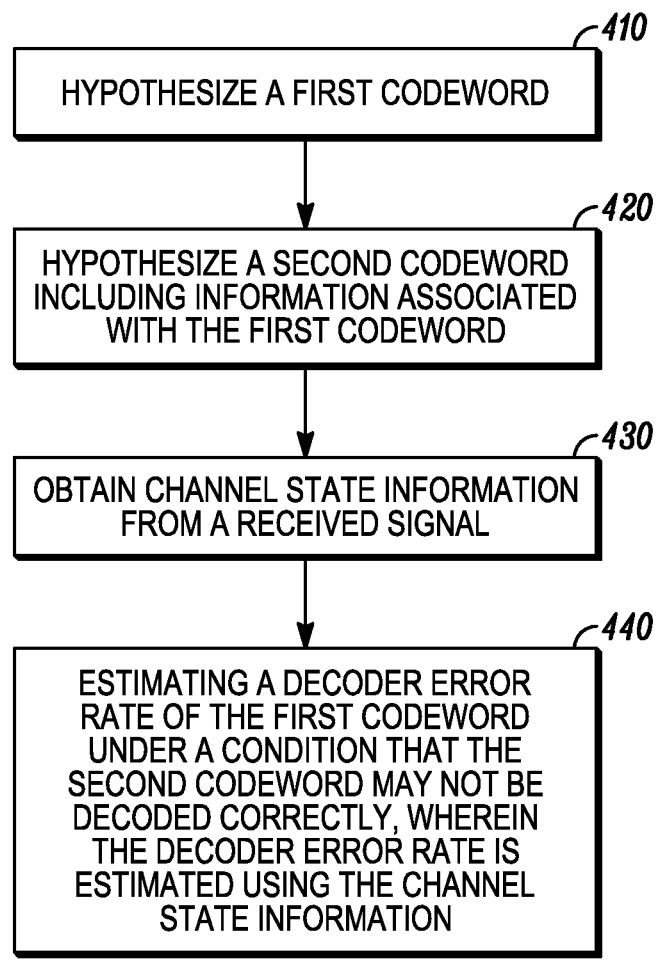
FIG. 4 is a process flowchart.

FIG. 4 illustrates a flow diagram for a process in a wireless communication terminal for predicting the performance of a radio link. At 410, the terminal hypothesizes a first codeword. At 430, the terminal hypothesizes a second codeword including information associated with the first codeword. In one embodiment, the first codeword corresponds to a control channel and the second codeword corresponds to a control format indicator channel carrying information related to the transmission parameters of the control channel. In another embodiment, the first codeword corresponds to a data payload and the second codeword corresponds to a control channel necessary for determining transmission parameters and scheduling information of a data payload.

In one implementation, the information, in the second code word, associated with the first codeword is a transmission parameter corresponding to any one of: a number of symbols on which the first codeword is mapped, or time-frequency resources on which the first codeword is mapped, or an encoding method used for generating the first codeword, or an information size of a payload of the first codeword, or a block length of the first codeword, or a rate of the first codeword, or a redundancy version number of the first codeword, or a transmit antenna configuration used for the first codeword, or pre-coding used for the first codeword.

In FIG. 4, at 430, the terminal obtains channel state information from a received signal. At 440, the terminal estimates a decoder error rate of the first codeword under a condition that the second codeword may not be decoded correctly, wherein the decoder error rate is estimated using the channel state information. In some embodiments, the terminal determines a synchronization status of the radio link based upon the estimated decoder error rate of the first codeword.

In another embodiment, the terminal hypothesizes a third codeword including information associated with the second codeword. The decoder error rate of the first codeword is estimated under a condition that the second and third codewords may not be decoded correctly, wherein the decoder error rate is estimated using a mapping function that includes channel state information. In a particular implementation, the first codeword corresponds to a data payload and the second codeword corresponds to a control channel, wherein the information of the second codeword includes transmission parameters and scheduling information of the data payload, and the third codeword corresponds to a control format indicator channel wherein the information of the third codeword includes information related to a transmission parameters of the control channel. Here too, channel quality indication reports may be generated based on the estimated decoder error rate for the first codeword. The information in the third code word is a transmission parameter corresponding to any one of: a number of symbols on which the second codeword is mapped, or time-frequency resources on which the second codeword is mapped, or an encoding method used for generating the second codeword, or an information size of a payload of the second codeword, or a block length of the second codeword, or a rate of the second codeword, or a redundancy version number of the first codeword, or a transmit antenna configuration used for the second codeword or pre-coding used for the second codeword.

In one embodiment, suppose a receiver attempts decoding of CW1 (and uses the embedded information) and then attempts to decode CW2. The probability of error in decoding of CW2 can be written as, $$p_e(CW_2) = 1 - (1 - p_e(CW_1))(1 - p_e(CW_2 | CW_1 \text{ correctly decoded})),$$

where, $p_e(CW_1)$ is the probability of decoding error associated with CW1, and $p_e(CW_2|CW_1$ correctly decoded) is the conditional probability of decoding of CW2 is in error when CW1 has been correctly decoded.

Suppose that the receiver estimates $p_e(CW_2)$ based on channel state information. Then, using the channel state information, it can estimate $p_e(CW_1)$ and $p_e(CW_2|CW_1$ correctly decoded) and then use the above equation to estimate $p_e(CW_2)$.

This concept can be generalized to estimating the BLER of a codeword CWn, whose decoding is conditional on the correct decoding of several other codewords CW1, CW2, ..., CW(n−1). The probability of decoding error of CWn can be expressed as, $$p_e(CW_n) = 1 - (1 - p_e(CW_1| \ldots |CW_{n-1}))(1 - p_e(CW_n|CW_1, \ldots, CW_{n-1} \text{ correctly decoded})),$$

where $p_e(CW_1| \ldots |CW_{n-1})$ is the probability that any of the codewords CW1, CW2, ..., CW(n−1) has been decoded incorrectly, and $p_e(CW_n|CW_1, \ldots, CW_{n-1}$ correctly decoded) is the probability of correct decoding of CWn given that CW1, ..., CW(n−1) have been decoded correctly. The interdependencies between the codewords CW1, ..., CWn can be used to further simplify the above equation.

In a second embodiment, a method is presented for estimating the BLER of the compound codeword directly from the channel state information corresponding to the time-frequency resources onto which the two codewords are mapped. First, we list some methods for the two codeword case (i.e., decoding of one codeword is conditioned on the correct decoding of one other codeword) and then list methods for the multiple codeword case (i.e., decoding of one codeword is conditioned on the correct decoding of two or more other codewords).

Two codeword case: Suppose a receiver attempts to decode CW1 (and uses the embedded information) and then attempts to decode CW2. Alternately, the two sets of subcarrier information $\{\gamma_k\}_{k=1}^{N_1}$ and $\{\eta_k\}_{k=1}^{N_2}$ can be used to obtain the relevant metrics. By modifying either of the three methods, Effective Exponential Sum of SINR Mapping (EESM) approach, Mean Mutual Information per Bit (MMIB) approach or SINR moments approach, we can jointly obtain the overall PDCCH BLER as follows.

EESM approach. Suppose that CW is the transmitted codeword and $p_e$ (CW) represents the probability that CW is decoded in error. Then, in the EESM method, a function $f_{eesm}(\bullet)$ maps the effective SNR defined as $$\gamma_{eff} = -\beta \ln\left(\frac{1}{N}\sum_{k=1}^{N} e^{-\gamma_k/\beta}\right),$$

where N is the codeword length, $\beta$ is a parameter that is derived using a suitable curve-fitting criterion (eg. min-max, least-squares, etc.), and $\{\gamma_k\}_{k=1}^{N}$ is the bitwise SINR obtained from the subcarrier SINR information for the encoded bits. The map $f_{eesm}(\bullet)$ is calibrated using simulations and subsequently, the approximation $p_e(CW) \approx f_{eesm}(\gamma_{eff})$ can be used for estimating the BLER using the subcarrier SINR information. A modified EESM approach is as follows:

$$\gamma_{eff} = -\beta_1 \ln\left(\frac{1}{N_1}\sum_{k=1}^{N_1} e^{-\gamma_k/\beta_1}\right)$$

and $$\eta_{eff} = -\beta_2 \ln\left(\frac{1}{N_2}\sum_{k=1}^{N_2} e^{-\eta_k/\beta_2}\right)$$

can be used jointly in the map $p_e$ (CW$_2$)$\approx g_{eesm}(\gamma_{eff}, \eta_{eff})$, where $g_{eesm}(\bullet)$ is a joint map that is calibrated in simulations.

MMIB approach. In the MMIB approach, generally, the mutual information per bit function is expressed in terms of J-functions as the basis function set. The J-functions are modulation-dependent (e.g., QPSK, 16QAM, etc.) and map the bitwise SINR to a mutual information per bit metric. The average mutual information metric is then mapped to BLER, and mapping function $f_{mmib}(\bullet)$ is calibrated using simulations. Subsequently, the approximation $p_e(CW) \approx f_{mmib}(I_{mean})$, where $I_{mean}$ is the mean of bitwise mutual information metric, can be used for estimating the BLER. A modified MMIB approach is as follows: $I_{mean}^{(1)}$ and $I_{mean}^{(2)}$ correspond to the MMIB metrics for CW1 and CW2 respectively, say, derived from $\{\gamma_k\}_{k=1}^{N_1}$ and $\{\eta_k\}_{k=1}^{N_2}$. A joint map $g_{mmib}(\bullet)$ can be calibrated to estimate the overall CW2 BLER, using the approximation $p_e(CW_2) \approx g_{mmib}(I_{mmib}^{(1)}, I_{mmib}^{(2)})$.

SINR moment approach: Alternately, the BLER can be estimated using the first few moments of the subcarrier SINR profile $\{\gamma_k\}_{k=1}^{N}$ as the input. Suppose $\bar{\gamma}, \overline{\gamma^2}, \overline{\gamma^3}, \ldots$, etc. denote the first, second, third and higher central moments of SINR sequence $\{\gamma_k\}_{k=1}^{N}$, defined as $$\overline{\gamma^n} = \frac{1}{N}\sum_{k=1}^{N} |\gamma_k|^n.$$

Then, a mapping function $f_{sinr}(\bullet)$ can be calibrated such that BLER is estimated using the expression $p_e(CW) \approx f_{sinr}(\bar{\gamma}, \overline{\gamma^2}, \overline{\gamma^3}, \ldots)$. The modified SINR moments approach is as follows: The first few SINR moments corresponding to CW1 and CW2, $\bar{\gamma}, \overline{\gamma^2}, \overline{\gamma^3}, \ldots$ and $\bar{\eta}, \overline{\eta^2}, \overline{\eta^3}, \ldots$ derived from $\{\gamma_k\}_{k=1}^{N_1}$ and $\{\eta_k\}_{k=1}^{N_2}$ can be used to calibrate a joint map $g_{sinr}(\bullet)$ to estimate the overall CW2 BLER using the approximation $p_e(CW_2) \approx f_{sinr}(\bar{\gamma}, \overline{\gamma^2}, \overline{\gamma^e}, \ldots; \bar{\eta}, \overline{\eta^2}, \overline{\eta^3}, \ldots)$.

Multiple codeword case: The mapping approaches above can be generalized to the case when BLER needs to be estimated for a codeword CWn, whose decoding is conditional on correctly decoding of several other codewords CW1, CW2, . . . , CW(n–1). The joint mapping function can be constructed for the three methods as below.

EESM approach:
$p_e(CW_n) \approx g_{eesm}(\gamma_{eff}^{(1)}, \gamma_{eff}^{(2)}, \ldots, \gamma_{eff}^{(n-1)})$, where $\gamma_{eff}^{(k)}$ corresponds to the effective SNR for codeword CWk.

MMIB approach:
$p_e(CW_n) \approx g_{mmib}(I_{mmib}^{(1)}, I_{mmib}^{(2)}, \ldots, I_{mmib}^{(n-1)})$, where $I_{mmib}^{(k)}$ corresponds to the mean mutual information per bit for codeword CWk.

SINR moments approach:
$p_e(CW_2) \approx f_{sinr}(\bar{\gamma_1}, \overline{\gamma_1^2}, \overline{\gamma_1^3}, \ldots; \bar{\gamma_2}, \overline{\gamma_2^2}, \overline{\gamma_2^3}, \ldots; \ldots; \bar{\gamma_{n-1}}, \overline{\gamma_{n-1}^2}, \overline{\gamma_{n-1}^3})$, where $\bar{\gamma_k}, \overline{\gamma_k^2}, \overline{\gamma_k^3}, \ldots$ correspond to the SINR moments for subcarriers carrying codeword CWk.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for predicting the performance of radio link in a wireless communication terminal, the method comprising:
   hypothesizing a first codeword;
   hypothesizing a second codeword including information associated with the first codeword;
   obtaining channel state information from a received signal; and
   estimating a decoder error rate of the first codeword under a condition that the second codeword may not be decoded correctly, the decoder error rate is estimated using the channel state information;
   wherein the first codeword corresponds to a data payload and the second codeword corresponds to a control channel necessary for determining transmission parameters and scheduling information of the data payload.

2. The method of claim 1, wherein the received signal corresponds to a cell-specific reference signal.

3. The method of claim 1 further comprising determining a synchronization status of the radio link based upon the estimated decoder error rate of the first codeword.

4. The method of claim 1 further comprising generating channel quality indication reports based on the estimated decoder error rate for the first codeword.

5. The method of claim 1 further comprising
   hypothesizing a third codeword including information associated with the second codeword;

estimating the decoder error rate of the first codeword under a condition that the second and third codewords may not be decoded correctly, the decoder error rate is estimated using a mapping function that includes channel state information.

6. The method of claim 5, wherein the first codeword corresponds to a data payload and the second codeword corresponds to a control channel, wherein the information of the second codeword includes transmission parameters and scheduling information of the data payload; and the third codeword corresponds to a control format indicator channel wherein the information of the third codeword includes information related to a transmission parameters of the control channel.

7. The method of claim 5 further comprising generating channel quality indication reports based on the estimated decoder error rate for the first codeword.

8. The method of claim 5, wherein the information in the third code word is a transmission parameter corresponding to any one of:

a number of symbols on which the second codeword is mapped, time-frequency resources on which the second codeword is mapped, or an encoding method used for generating the second codeword, or an information size of a payload of the second codeword, or a block length of the second codeword, or a rate of the second codeword, or a redundancy version number of the first codeword, or a transmit antenna configuration used for the second codeword or pre-coding used for the second codeword.

9. A wireless communication terminal comprising:

a transceiver;

a controller coupled to the transceiver, the controller configured to hypothesize a first codeword and to hypothesize a second codeword including information associated with the first codeword, the controller configured to obtain channel state information from a received signal, the controller configured to estimate a decoder error rate of the first codeword under a condition that the second codeword is not decoded correctly, the decoder error rate is estimated using a mapping function that includes channel state information;

wherein the first codeword corresponds to a data payload and the second codeword corresponds to a control channel necessary for determining transmission parameters and scheduling information of the data payload.

10. The terminal of claim 9, the controller configured to determine synchronization status of the radio link based upon the estimated decoder error rate of the first codeword.

11. The method of claim 9, the controller configured to generate channel quality indication reports based on the estimated decoder error rate for the first codeword.

12. The terminal of claim 9, the controller configured to hypothesize a third codeword including information associated with the second codeword and to estimate the decoder error rate of the first codeword under a condition that the second and third codewords are not decoded correctly.

13. The terminal of claim 12, wherein the first codeword corresponds to a data payload and the second codeword corresponds to a control channel, wherein the information of the second codeword includes transmission parameters and scheduling information of the data payload, and the third codeword corresponds to a control format indicator channel wherein the information of the third codeword includes information related to a transmission parameters of the control channel.

14. The terminal of claim 12, the controller configured to generate channel quality indication reports based on the estimated decoder error rate for the first codeword.

15. The terminal of claim 12, the information in the third code word is a transmission parameter corresponding to any one of:

a number of symbols on which the second codeword is mapped, time-frequency resources on which the second codeword is mapped, or an encoding method used for generating the second codeword, or an information size of a payload of the second codeword, or a block length of the second codeword, or a rate of the second codeword, or a redundancy version number of the first codeword, or a transmit antenna configuration used for the second codeword or pre-coding used for the second codeword.

* * * * *